United States Patent
Moshfeghi

(10) Patent No.: US 9,785,857 B2
(45) Date of Patent: *Oct. 10, 2017

(54) HYBRID MULTI-CAMERA BASED POSITIONING

(71) Applicant: Golba LLC, Rancho Palos Verdes, CA (US)

(72) Inventor: Mehran Moshfeghi, Rancho Palos Verdes, CA (US)

(73) Assignee: GOLBA LLC, Rancho Palos Verdes, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/252,180

(22) Filed: Aug. 30, 2016

(65) Prior Publication Data

US 2017/0053419 A1    Feb. 23, 2017

Related U.S. Application Data

(63) Continuation of application No. 14/062,075, filed on Oct. 24, 2013, now Pat. No. 9,453,904.

(60) Provisional application No. 61/856,031, filed on Jul. 18, 2013.

(51) Int. Cl.
 *G06K 9/46* (2006.01)
 *G01S 5/02* (2010.01)
 (Continued)

(52) U.S. Cl.
 CPC ............ *G06K 9/46* (2013.01); *G01S 5/0263* (2013.01); *G01S 5/0289* (2013.01); *G06T 7/292* (2017.01);
 (Continued)

(58) Field of Classification Search
 CPC ............... G06T 7/2093; G06T 7/0042; G06T 2207/30196; G01S 5/0263; G01S 5/0289; G06K 9/46
 (Continued)

(56) References Cited

U.S. PATENT DOCUMENTS 5,365,516 A  11/1994 Jandrell
8,314,736 B2 11/2012 Moshfeghi
(Continued)

OTHER PUBLICATIONS

Portions of prosecution history of U.S. Appl. No. 12/852,443, dated Oct. 9, 2012, Moshfeghi, Mehran.
(Continued)

*Primary Examiner* — Amandeep Saini
(74) *Attorney, Agent, or Firm* — Adeli LLP

(57) ABSTRACT

A positioning server is connected to a collection of access points, base stations, NFC stations, and image or video cameras and the collected data is used for positioning objects. A plurality of electronic devices are paired with an object by tracking the position of the object based on imaging and the position of electronic devices based on RF signals in vicinity of the object. Once a device is paired with an object, the propagation channel profile measured through the electronic device is used to develop and tune a database of channel profiles versus location. This database is used based on signature/profile matching and correlation for positioning devices and objects that do not have pairing or have poor image-based positioning accuracy or reliability. When a device is detected that cannot be paired with any object, or a device that is unpaired from a previously associated object, a theft or loss alert is generated.

22 Claims, 10 Drawing Sheets

(51) Int. Cl.
  *G06T 7/292* (2017.01)
  *G06T 7/73* (2017.01)
(52) U.S. Cl.
  CPC ...... *G06T 7/73* (2017.01); *G06T 2207/10016* (2013.01); *G06T 2207/10024* (2013.01); *G06T 2207/10048* (2013.01); *G06T 2207/30196* (2013.01); *G06T 2207/30244* (2013.01)
(58) Field of Classification Search
  USPC .......................................................... 382/115
  See application file for complete search history.

(56) References Cited

U.S. PATENT DOCUMENTS

| | | | |
|---|---|---|---|
| 9,173,187 | B2 | 10/2015 | Moshfeghi |
| 9,453,904 | B2 | 9/2016 | Moshfeghi |
| 2008/0129825 | A1* | 6/2008 | DeAngelis ......... A63B 24/0021 348/169 |
| 2008/0167049 | A1 | 7/2008 | Karr et al. |
| 2008/0231449 | A1* | 9/2008 | Moshfeghi ............. G01D 21/00 340/572.1 |
| 2010/0222081 | A1 | 9/2010 | Ward et al. |
| 2016/0146922 | A1 | 5/2016 | Moshfeghi |

OTHER PUBLICATIONS

Portions of prosecution history of U.S. Appl. No. 13/678,484, dated Sep. 30, 2015, Moshfeghi, Mehran.
Portions of prosecution history of U.S. Appl. No. 14/920,888, dated Mar. 23, 2017, Moshfeghi, Mehran.
Portions of prosecution history of U.S. Appl. No. 14/062,075, dated Aug. 26, 2016, Moshfeghi, Mehran.
Zhou, Quming, et al., "Object Tracking in an Outdoor Environment Using Fusion of Features and Cameras," Image and Vision Computing 24, Jun. 7, 2005, 12 pages, Elsevier B.V., USA.

* cited by examiner

| Location Elements | Propagation Channel Characteristics | | |
|---|---|---|---|
| Location Coordinates (X, Y, Z) | WRSSI from all APs | TOA/AOA from all APs | Channel response from all APs |

| Electronic Devices | Detected locations using RF-based methods (and time tags) | Electronic IDs |
|---|---|---|
| Smartphone 1 | Location $(x_{11}, y_{11}, z_{11})$ @time $T_{11}$, ..., location $(x_{1N}, y_{1N}, z_{1N})$ @time $T_{1N}$ | MAC $ID_1$, IP $Add_1$, $IMEI_1$ |
| ⋮ | ⋮ | ⋮ |
| Wearable Device M | Location $(x_{M1}, y_{M1}, z_{M1})$ @time $T_{11}$, ..., location $(x_{MN}, y_{MN}, z_{MN})$ @time $T_{MN}$ | MAC $ID_M$, IP $Add_M$, $IMEI_M$ |

| User ID | | Associated Electronic Devices |
|---|---|---|
| User 1 | Profile $P_1$ (face image, color feature, cloths feature) | Smartphone 1 |
| ⋮ | ⋮ | ⋮ |
| User K | Profile $P_K$ (face image, color feature, cloths feature) | Smartphone K_1, wearable device K_2 |

| User ID | Detected locations using image-based methods (and time tags) | Image Profile/Feature |
|---|---|---|
| User 1 | Location $(x'_{11}, y'_{11}, z'_{11})$ @time $T'_{11}$, ..., location $(x'_{1N}, y'_{1N}, z'_{1N})$ @time $T'_{1N}$ | Profile $P_1$ (face image, color feature, cloths feature) |
| ⋮ | ⋮ | ⋮ |
| User K | Location $(x'_{K1}, y'_{K1}, z'_{K1})$ @time $T'_{K1}$, ..., location $(x'_{KN}, y'_{KN}, z'_{KN})$ @time $T'_{KN}$ | Profile $P_K$ (face image, color feature, cloths feature) |

*Fig. 5*

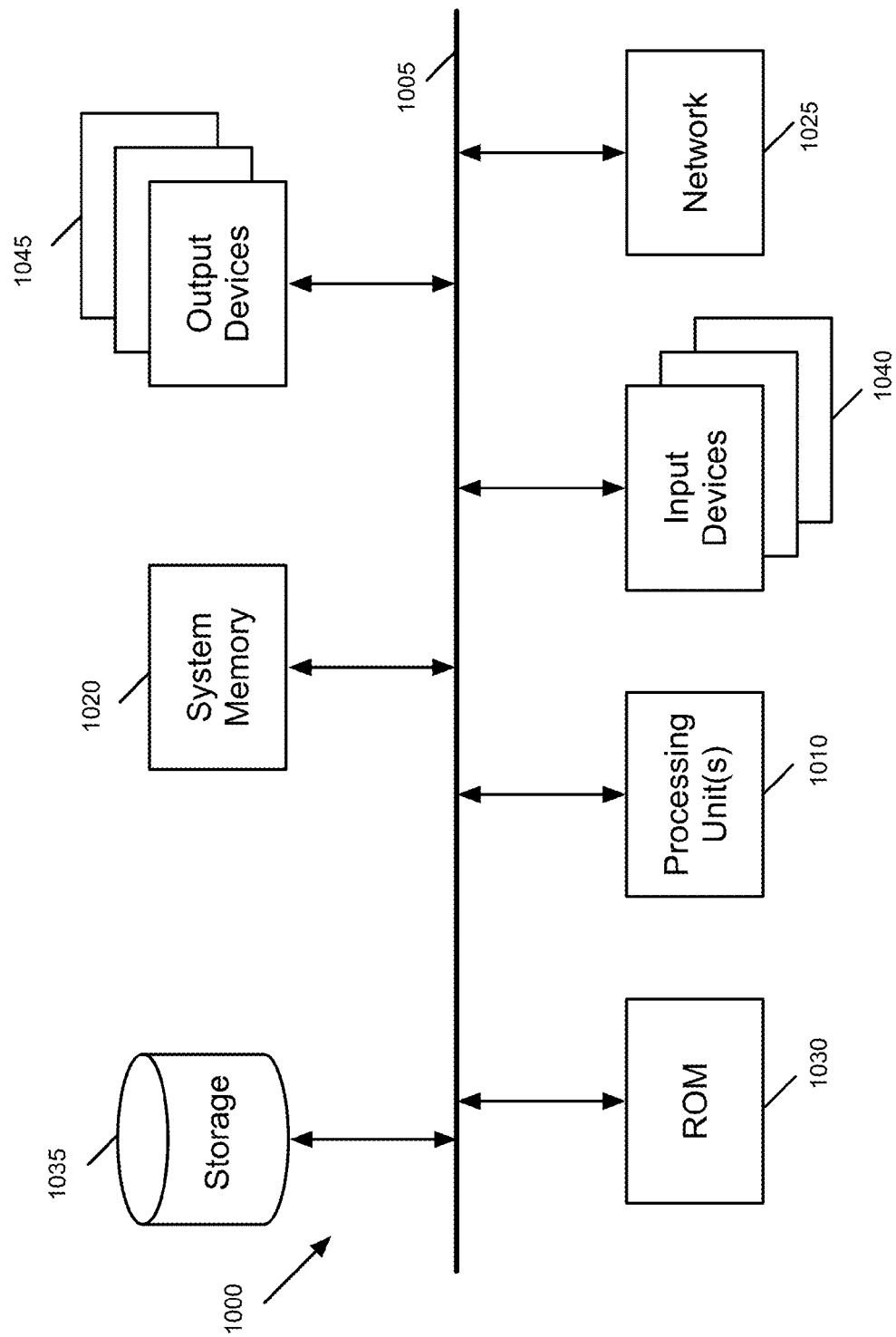

US 9,785,857 B2

HYBRID MULTI-CAMERA BASED POSITIONING

CLAIM OF BENEFIT TO PRIOR APPLICATIONS

The present Application is a continuation application of U.S. patent application Ser. No. 14/062,075, entitled "Hybrid Multi-Camera Based Positioning," filed Oct. 24, 2013, published as U.S. Patent Publication 2015-0023562. U.S. patent application Ser. No. 14/062,075 claims the benefit of U.S. Provisional Patent Application 61/856,031, entitled, "Hybrid Multi-Camera Based Positioning," filed Jul. 18, 2013. The contents of U.S. Provisional application 61/856,031 and U.S. patent application Ser. No. 14/062,075, published as U.S. Patent Publication 2015-0023562 are hereby incorporated by reference.

BACKGROUND

Indoor positioning applications generally require high accuracy. Indoor positioning, however, is a challenging problem as global positioning system (GPS) signals are often not detectable in indoor environments. There exist a number of radio frequency (RF)-based indoor positioning methods that rely on the use of RF (wireless local area network (WLAN), Bluetooth®, etc.) for indoor positioning. These methods estimate the time-of-arrival (ToA) and/or angle-of-arrival (AoA) of RF signals that propagate between a mobile device and a set of fixed access points (e.g., WLAN access points with known a posteriori coordinates). The methods then use triangulation to calculate the position of the device.

These methods work very well when direct line-of-sight (LoS) exists between the mobile device and the access points. However, the performance of these methods degrades very rapidly in multipath environments, where large numbers of reflections are present in the environment and/or no direct LoS is accessible.

Some have suggested the use of pre-scanning (fingerprinting) of the environment's propagation profile as a function of location coordinates to be able to correlate and uniquely map a measured propagation profile to a position. Although this method is resilient to lack of LoS paths, it requires the pre-scanning phase, which may be impractical or costly in many usage applications.

BRIEF SUMMARY

Some embodiments provide methods for utilizing a set of video and/or still imaging cameras to provide accurate indoor positioning and positioning services. These embodiments utilize a combination of still image and/or video based positioning by analyzing several still image/video feeds on an object (e.g., a person) from different angles along with RF based positioning (e.g., Wi-Fi waveforms, angle-of-arrival and/or time-of-arrival of RF waveforms) to provide accurate positioning information (e.g., on a person's handheld device such as smartphone, laptop, etc.).

Some embodiments rely on still image and/or video feeds from multiple cameras (with known positions) to substitute, complement and/or improve the RF-based indoor positioning methods. The positioning system of some embodiments relies on a set of still images/video feeds to identify, position, and track objects (e.g., people, equipment) in an environment where existing positioning methods (e.g., Wi-Fi based, GPS based, TOA/AOA) do not provide sufficient accuracy or reliability. Multiple image and/or video feeds from multiple cameras are used for image processing to detect and position a mobile object based on the position of the same object in one or multiple of image snapshots taken by multiple cameras.

Some embodiments combine image-based methods with RF-based methods in a complementary fashion to implement a hybrid method for better coverage and accuracy. In order to communicate the image-based location estimation to a user of an electronic device, an additional RF-based positioning method is used to identify and pair (or associate) an electronic device (such as a smartphone with embedded Bluetooth®, Wi-Fi, GPS, cellular connection, etc.) with the device user. In other words, the paired electronic device's wireless connection is used as a means to feedback the estimated position (using multi-cameras) to the electronic device and to display it to the device user. In the hybrid mode, a weighted sum of positions calculated by the two methods is used. The weighting coefficients are proportional to the accuracy and reliability of each calculation in some embodiments. In general, the object to track may be a person, equipment, vehicle, or any object that is carrying an electronic device capable of doing RF communication.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 5 illustrates various database tables, information elements, and data structures that are maintained and managed by the positioning server in some embodiments of the invention.

FIG. 10 conceptually illustrates an electronic system with which some embodiments of the invention are implemented.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

In some embodiments, a positioning server is connected to a collection of access points, base stations, near field communication (NFC) stations, still image cameras, and video cameras and uses the collected data for positioning humans or objects. The positioning server uses (e.g., controls, operates, or receives data from) these units for the purpose of hybrid positioning. The positioning server locates an object such as a person or a piece of equipment by using image based and/or sound based techniques. The positioning server then identifies an electronic device carried by or attached to the object by using RF based techniques. The positioning server then derives accuracy regions for the identified object and the electronic devices in the vicinity of the object and uses the accuracy regions to pair the object to one or more of the electronic devices. The object is paired to the electronic devices by tracking the position of the object based on imaging and the position of electronic devices based on RF signals. In this hybrid approach, the positioning server pairs the object with the electronic device by using the superior image-based techniques to locate the object and using the easily obtained identification of the paired electronic device to identify the object.

Once an electronic device is paired with an object, the propagation channel profile measured through the electronic device is used to develop and tune a database of channel profiles versus location. This database is used based on signature/profile matching and correlation for positioning devices and objects that do not have pairing or have poor image-based positioning accuracy or reliability.

Figure 1:
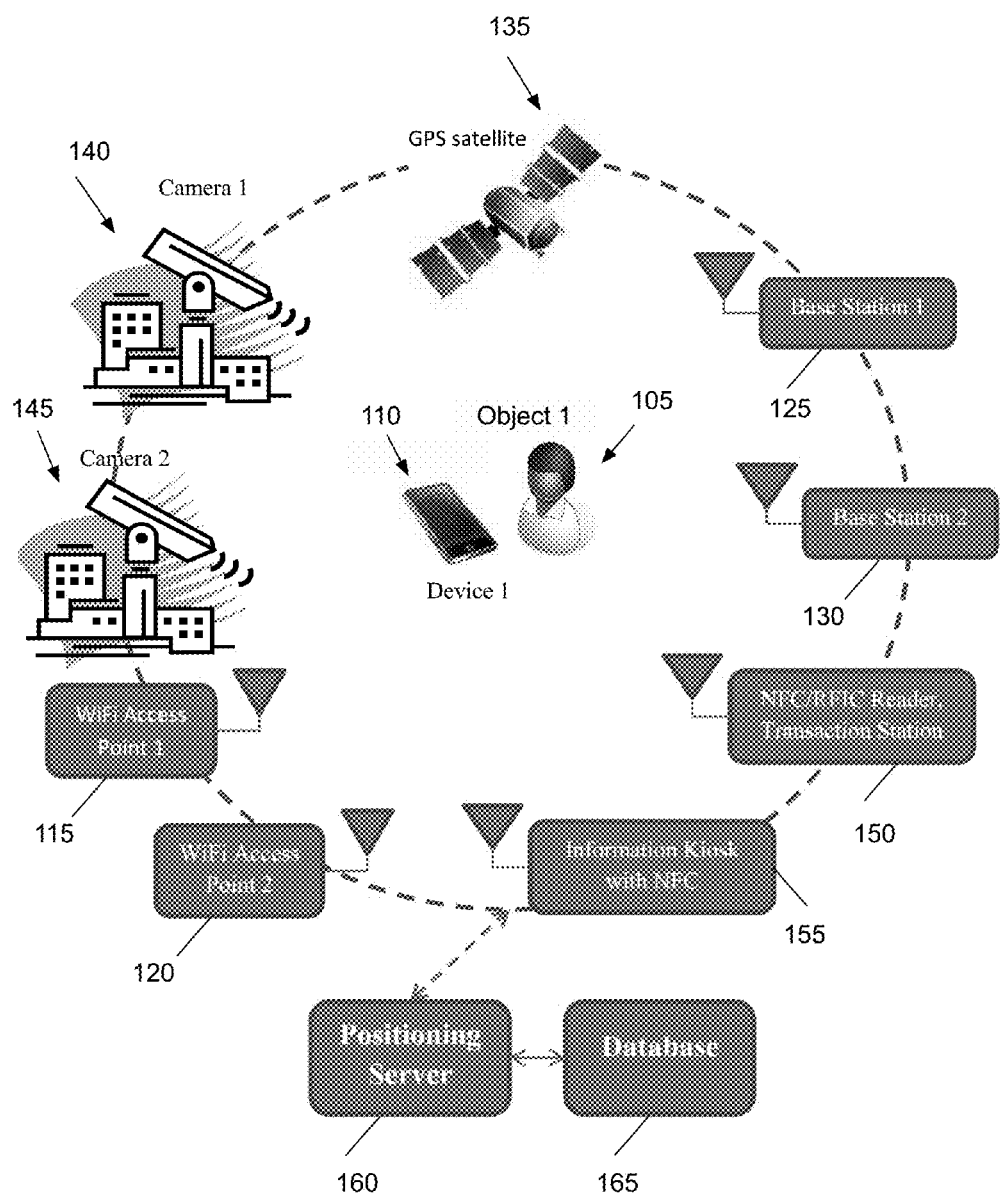
FIG. 1 conceptually illustrates overall system architecture of some embodiments of the invention.

FIG. 1 conceptually illustrates an overall usage scenario and various possible components present in the system of some embodiments of the invention. In some usage scenarios, object 1 105 is carrying the device 1 (e.g. a smartphone) 110. The goal is to estimate the position of object 1105. The position estimate is utilized to provide positioning services such as displaying the position on the device of a person (e.g., device 1110). One application is when object 105 is a person and the person accesses the estimated location through his/her electronic device 110. Other applications include tracking objects such as vehicles and equipment, providing location-based information and advertisements to persons carrying electronic devices, recovering lost or stolen devices, etc.

Some embodiments utilize one or more of the followings: (i) RF-based access points and gateways such as Wi-Fi access points (e.g., access points 115-120), Femtocell access points, Wi-Max gateways, Bluetooth devices, millimeter wave (mmWave) stations, etc., which may be used for RF-based positioning of an electronic device with compatible communication capabilities (ii) cellular base stations (such as base stations 125-130), which may be used for RF-based positioning of an electronic device with cellular capability, (iii) positioning satellites (such as satellite 135), which may be used for RF-based positioning of an electronic device with GPS reception capability, (iv) still image/video/infra-red camera feeds (such as feeds from cameras 140-145), which may be used for image-based positioning of an object such as a person or a piece of equipment, (v) transaction/cashier stations (such as station 150) with NFC or radio-frequency identification (RFID) technology, which may be used for RF-based positioning of an electronic device with NFC or RFID capability, (vi) information kiosks (such as kiosk 155, e.g., mall map station) with NFC or RFID technology, which may be used for RF-based positioning of an electronic device with NFC or RFID capability, (vii) sound-based sensors (such as ultrasound sensors), which may be used for sound-based positioning of an object such as a person or a piece of equipment.

In some embodiments, the above components are connected (through wired or wireless connection) to a set of one or more positioning servers 160 (referred to hereinafter as the positioning server for simplicity). The positioning server processes data received from these components and derives the location estimates for objects and electronic devices. The positioning server in some embodiments also connects to and manages a database 165 for storing data related to positioning.

Although FIG. 1 shows each element as a separate device, in some embodiments more than one element is integrated into a single device. For instance, either a Wi-Fi access point and a video camera; a kiosk and a video camera; a kiosk, an access point, and a camera can be integrated into a single device.

Some embodiments utilize the following three phases: (i) detection and positioning of a person or an object (using image-based methods), (ii) detection and positioning of an electronic device (using RF-based methods), and (iii) pairing/associating the object with the device.

The terminology of associating or pairing an electronic device and an object or person is used in the following context. Let's assume the image-based positioning method identifies and tracks three face images and labels them as person X, Y, and Z. In parallel, the RF-based method identifies and tracks three electronic devices and labels them as device A, B, and C. The pairing/associating process is referred to the procedure that identifies which of these devices are carried and/or owned by which person. For example, the positioning server may conclude that person X is paired with device B (person X is carrying device B), person Y is paired with device C, and person Z is paired with device A.

Figure 2:
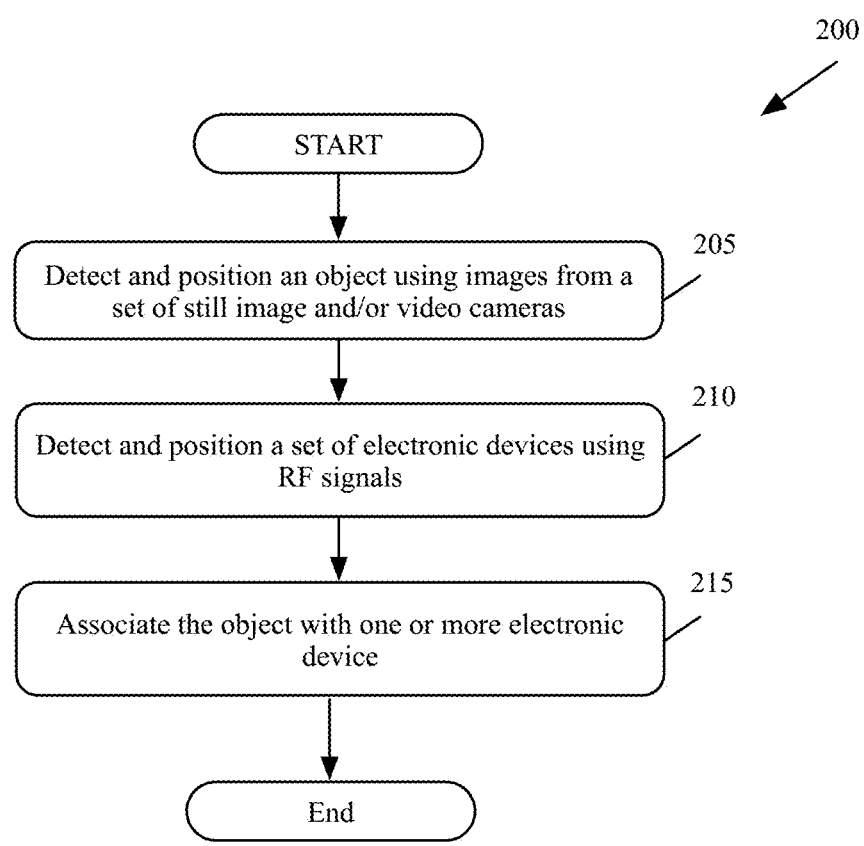
FIG. 2 conceptually illustrates a process for performing hybrid positioning in some embodiments of the invention.

FIG. 2 conceptually illustrates a process 200 for performing hybrid positioning in some embodiments of the invention. In some embodiments, process 200 is performed by a positioning server such as the positioning server 160 described by reference to FIG. 1, above. The process, in phase one, detects and positions (at 205) an object such as a human by using images received from a group of still image and/or video cameras. The term image is used herein to refer to still as well as video images. In phase one, multiple image feeds (still or video images) from cameras, such as camera 1 140 and camera 2 145 shown in FIG. 1, are used to identify and estimate the location of the objects.

Image processing, pattern recognition, face recognition, and feature detection algorithms are used by the positioning server to first identify a person or an object, such as object 1 105, and then estimate its location. Methods, such as correlating images taken at different angles from multiple cameras, are used for this purpose. In some embodiments, the object is identified, e.g., by comparing/correlating the images taken by the cameras with a set of images stored in a database.

In some embodiments, feature/color detection methods are used to identify and locate a human through multi-camera snapshots. For instance, a face feature, clothes' colors, height, a carry-on bag, etc., is used to uniquely identify a person, track that person across multiple video captures, and hand-off from one camera coverage to another camera coverage.

Once an object is identified in multiple still/video image feeds, the two-dimensional position of that object (e.g., object 1 105 in FIG. 1) is extracted from the multiple video feeds of cameras (e.g., camera 1 140 and camera 2 145 in FIG. 1). Given the position of camera 1 140 and camera 2 145 (e.g., their x, y, z, coordinates in a coordinate system used by the positioning server, latitude/longitude/height, etc.), their orientation, and the extracted two-dimensional position of the object in the video/image snapshots, a 3-dimensional location for the object is estimated by using techniques such as geometrical correlation, geometrical triangulation, and triangular mapping. For instance, geometrical triangulation determines the location of an object by measuring angles to the object from at least two known points. The location of the object is then determined as the third point of a triangle with one known side and two known angles. Further details of using a multi camera system to identify and track objects are described by Q. Zhou, and J. K. Aggarwal, "Object tracking in an outdoor environment using fusion of features and cameras," Image and Vision Comp. 24, 1244-1255 (2006). The content of this document is incorporated by reference.

In phase two, process 200 detects and positions (at 210) a set of electronic devices using RF signals. In this phase RF-based methods are used to detect, estimate, and track the position of the electronic devices, such as device 1 110 in FIG. 1. Depending on the availability of wireless capabilities within device 1, WLAN, Bluetooth®, Cellular RF, or other signaling between the device and a set of access-points/base-stations are used to estimate time-of-arrival (ToA) and/or angle-of-arrival (AoA) of signals between the device and set of access-points/base-stations. These measurements are then processed (e.g. with algorithms such as triangulation) to calculate the position of the electronic device.

When a device is used for any electronic transaction/association through a short-range interface such as proximity RFID or NFC, the location of the RFID/NFC reader is used in some embodiments to identify the location of the device. For example, when a device is used to make a payment through an NFC connection (e.g., at a transaction/cashier station such as station 150 shown in FIG. 1), the location of the NFC reader/station is used as the location of the device. Similarly, if a device is used to download a map/catalog/video at an information kiosk (e.g., kiosk 155 shown in FIG. 1) through an NFC association, the location of the information kiosk's NFC reader is used as the location of the device.

In phase three, process 200 associates (at 215) the object with one or more electronic devices. In this phase objects or persons are paired to electronic devices. The positioning server 160 tracks the location of the object (e.g., object 1 105) through multi-camera snapshots, and tracks the location of the electronic devices (e.g., device 1 110) through RF based methods. Initially, the positioning server has no knowledge of the association between object 1 and device 1.

The positioning server derives a location estimation accuracy/region for object 1 and a location estimation accuracy/region for device 1 based on their respective positioning method. The positioning server then continues to monitor object 1 and the location of all electronic devices in the vicinity of object 1. If at any instance one or more devices are identified to have a high probability of proximity to object 1, that device (e.g., device 1 in FIG. 1) becomes associated with object 1. The estimation accuracy/range is used to evaluate the probability of proximity of a device to object 1 (by overlapping their respective accuracy ranges).

In some embodiments, multiple instances (e.g., a sequence of instances) are used to uniquely associate a device with an object. For example, assume at one instance two devices m, n are identified to be within close proximity of object 1. If previous instances demonstrate that device m has not been in close proximity of object 1, then the positioning server concludes that device n is associated with object 1.

I. Pairing an Object with One or More Electronic Devices

With no loss of generality, several procedures, usage scenarios, and data structures are described in detail to clarify implementation of some embodiments of the invention. In some embodiments, the humans and devices are identified as they enter the environment. If a human or a device happens to have been in the environment in the past, the previous recorded data is utilized. Preregistration is, however, not a requirement. For instance, when a Wi-Fi device enters the environment for the first time, the Wi-Fi access points sense the new Wi-Fi device along with the device identifications (such as IP address or media access control address (MAC address or MAC ID)). If the device identification doesn't exist in the database, the device is assigned a new identification in the database. Similarly, when an object or a person enters the environment for the first time, the server identifies the new person through feature/face recognition. The feature/image pattern is then used to register the new object or person in the database.

Figure 3:
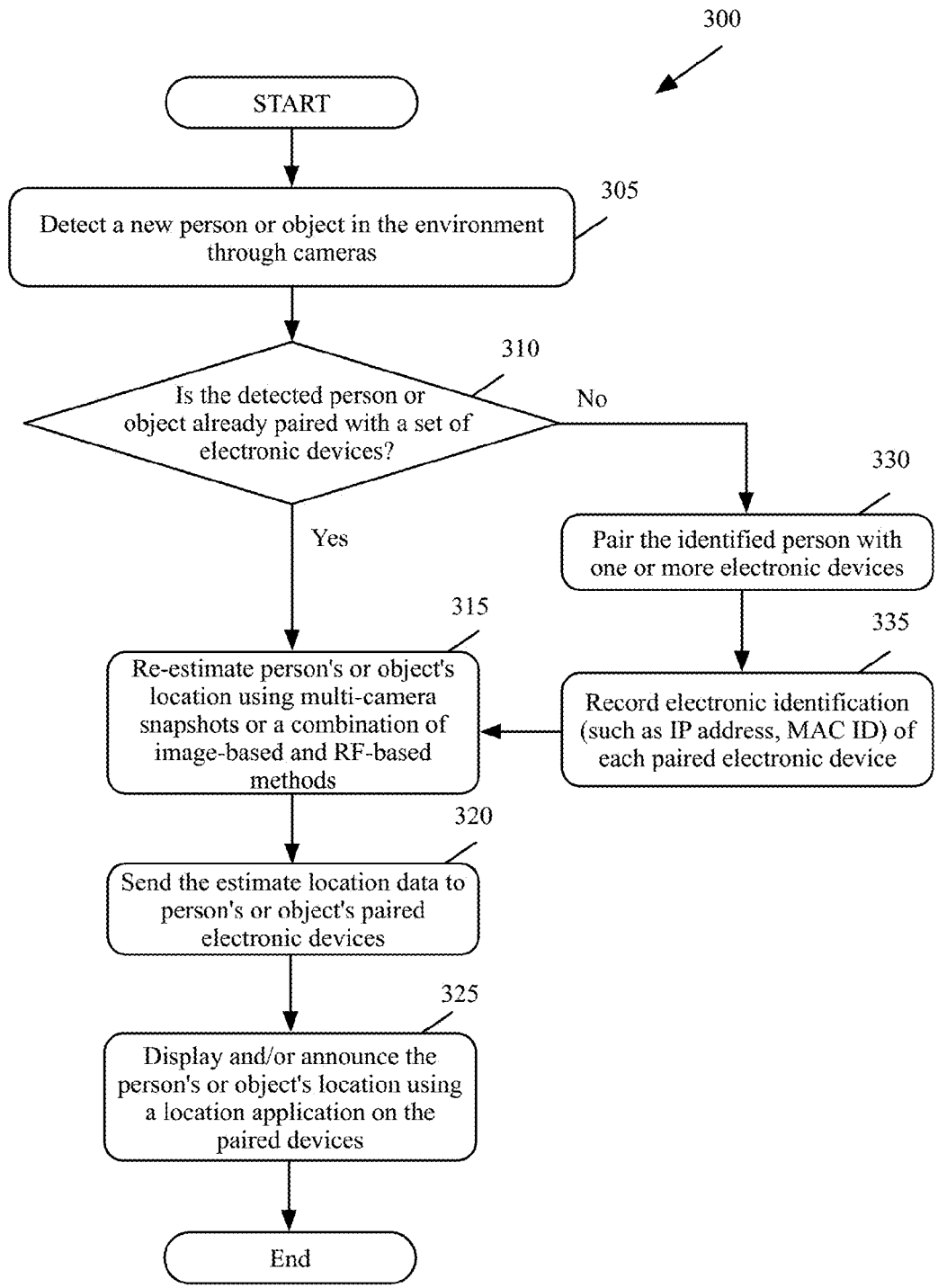
FIG. 3 conceptually illustrates a process for calculating and displaying the image-based location on a user's electronic device in some embodiments of the invention.

FIG. 3 conceptually illustrates a process 300 performed when an object such as a person, a piece of equipment, a vehicle, etc., is identified and positioned through multi-camera image feeds in some embodiments of the invention. In some embodiments, process 300 is performed by a positioning server. As shown (at 305), an object (e.g., User K who is assigned a serial identification number for storage in the database) is detected (e.g., through a face recognition algorithm running on the positioning server) and then the object's position is calculated with multi-camera images.

The positioning server compares the image features (e.g., facial features of User K's images) against the images stored in a database (such as sub-database 504 described by reference to FIG. 5, below) to determine (at 310) whether the image taken and associated with User K matches an image profile in sub-database 504. The positioning server also checks sub-database 503 to determine whether User K is paired with one or more electronic devices. If the pairing is already established, the positioning server re-estimates (at 315) the object's location using multi-camera snapshots or a combination of image-based and RF methods.

The new position is then utilized for location-based services. For instance, the positioning server pushes (at 320) the new location for the object (e.g., User K) to the electronic devices associated with the object. If the object is a person, the new position is displayed (at 325) on the screen of the person's devices or utilized by the applications running on his/her devices (e.g., to update a map or to audibly announce the position). In addition, or alternately, the new position is utilized to update a database, to send information or advertisements, to track the object, etc.

If the positioning server determines that no pairing is yet established for object's image features (e.g., User K had just walked into the building or mall), the positioning server pairs (at 330) the identified object with one or more electronic devices (e.g., by performing the "pairing procedure/ algorithm" as described in FIG. 4, below). The positioning server then records (at 335) one or more identifications (such as IP address or MAC ID) of each paired electronic device in the database (e.g., in sub-database 502 in FIG. 5). The process then proceeds to 315, which was described above.

Figure 4:
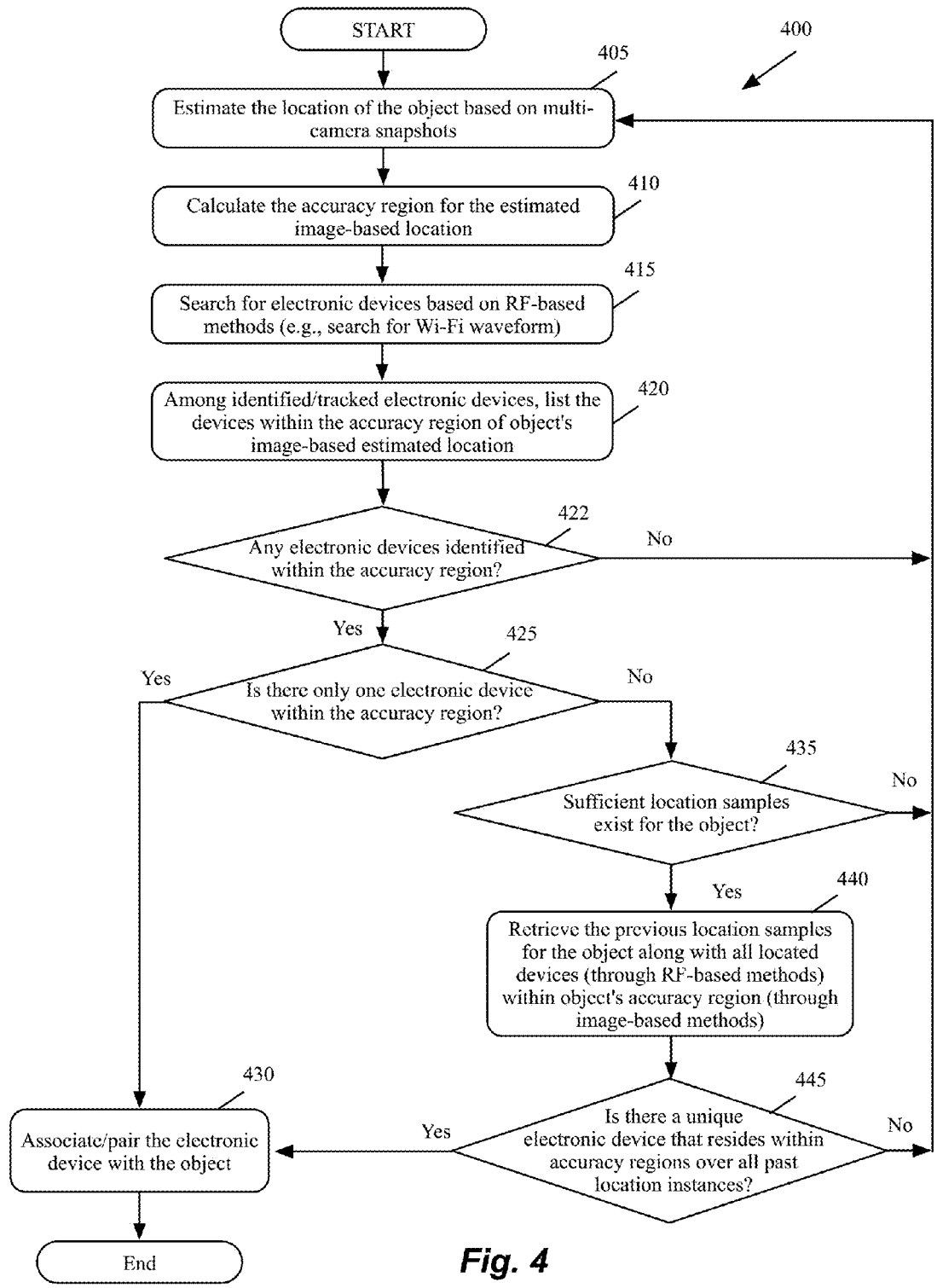
FIG. 4 conceptually illustrates a process for pairing an object with an electronic device in some embodiments of the invention.

FIG. 4 conceptually illustrates a process 400 to pair and associate an object's image profile (e.g., User K's image profile) with an electronic device (e.g., Device K) believed to be attached to the object or in possession of the user. In some embodiments, process 400 is performed by a positioning server. As shown, the process estimates (at 405) the location of the object based on multi-camera snapshots. For instance, User K's image features are identified and his/her location is consequently estimated using image-based positioning. The image features and corresponding estimated position are stored in sub-database 504 shown in FIG. 5. Assume the scenario where this image feature is not yet associated with an electronic device (i.e., not listed under sub-database 503 in FIG. 5).

The process (e.g., using an image positioning algorithm running on the positioning server) identifies (at 410) an estimation accuracy and/or accuracy region as part of positioning algorithm. In some embodiments, algorithms and/or image processing used to locate the object in the images also provide an accuracy measure. This accuracy measure is then used to define a region around the estimated location (for example, accuracy region with 90% certainty, 99% certainty, etc.).

The positioning server then searches (at 415) for electronic devices based on RF-based methods (e.g., searches for Wi-Fi waveform) and stores the identification of any electronic devices found in the database. For instance, in some embodiments detecting a user or an object by a camera triggers a search in a certain distance around the camera for electronic devices. In addition (or instead) the process periodically searches for electronic devices in all regions, where any components described in FIG. 1 are connected to the positioning server, and keeps on updating the database.

The process then searches (at 420) the database (e.g., the sub-database 502 in FIG. 5) for any electronic device that has an estimated location with an accuracy region overlapping with the accuracy region of User K's image-based position at the same time (or a time stamp within a predetermined threshold).

When RF based methods are used for estimating the location of a device, an accuracy range/region is derived in some embodiments. The accuracy range specifies a region around the estimated location for the device (i.e., x, y, z coordinates) that the device is expected to be within with a very high probability. This accuracy and region is derived based on the accuracy and consistency of RF based measurements. For instance, when a severe multipath propagation environment is measured between a device and an access point, a higher measurement error is associated with the time-of-arrival estimation between the device and the access point. Similarly, noise/estimation variances on RSSI and AoA measurements may translate to higher estimation errors for the final location of a device, thereby resulting in a larger accuracy region.

As an example, assume the person is positioned using image-based method to be at (X, Y, Z)=(10, 0, 0) with an accuracy range of 1 unit of measure. This means the person is likely to be within a circle of radius 1 around point (10, 0, 0). Now, let's assume the device is positioned using RF-based method to be at (X, Y, Z)=(8, 0, 0) with an accuracy range of 2. This means the device is likely to be within a circle of radius 2 around point (8, 0, 0). The above two regions will have an overlap, indicating the person and device are associated and paired. If the two regions didn't overlap, then the device's association with the person is ruled out.

The process then determines (at 422) whether any electronic devices are identified within the accuracy region. If not, the process proceeds to 405, which is described above. Otherwise, the process determines (at 425) whether there is only one electronic device within the accuracy region. If not, the process proceeds to 435, which is described below. Otherwise, when the process identifies only one electronic device within that accuracy region, the process uniquely pairs (at 430) the electronic device with the object (and the object's image profile) and lists the pair in sub-database 503 for future usages. The process then ends.

When the process identifies multiples electronic devices within the accuracy range of the object at a time instance $T_0$, the process determines (at 435) whether there are sufficient samples for the object. For instance, the process in some embodiments requires a predetermined number of location samples for an object in order to pair an electronic device (in operations 440-445, below) with the object. If enough samples are not collected yet, the process proceeds back to 405 to wait for more samples to be taken. Otherwise, the process retrieves (at 440) the past position estimates for the same object and the list of electronic devices within the accuracy regions in the past. The retrieve depth, i.e. the time distance from $T_0$ that the process looks back to retrieve the samples, is a programmable parameter in some embodiments. If the server determines (at 445) that there is a single unique device that falls within the accuracy region in a number of past instances, the process proceeds to 430 to complete the pairing process and list the pair in sub-database 503 for future usages.

When a reliable pairing is not achievable, the process proceeds to 405 to wait to collect more measurements (both image-based and RF-based) to achieve a reliable pairing in the future. In some embodiments, the positioning server assumes any object can have several (e.g., 2, 3, or more) accompanying electronic devices. In these embodiments, the process looks (at 445) for several devices that consistently fall within the accuracy region of object's image-based position estimates over time. Once several devices consistently fall within the accuracy region of object's image-based position, the plurality of devices are associated/paired (at 430) with the object. In other words, the trajectories of multiple devices and an object overlap based a pre-determined number of measurements and/or for a predetermined amount of time.

There are several embodiments for associating multiple devices with a single object (described herein for two mobile devices but extendable to any number of mobile devices). In some embodiments, the positioning server declares a successful association if two mobile devices fall within the accuracy range of an object's image-based estimation (over multiple time instances), while the devices do not fall within the accuracy region of any other object (over those same time instances). In some embodiments, elimination algorithms are used to reliably associate two mobile devices with a single object even in the presence of multiple objects in the vicinity. Assume positioning server identifies mobile devices M1 and M2 at time $t_0$ to be in the vicinity (i.e., within the accuracy region) of only users U1, U2, U3. Therefore the positioning server cannot establish any association yet. At time $t_1$, the positioning server identifies mobile devices M1 and M2 in the vicinity of users U1, U4, U5. Based on these two measurements, the positioning server concludes mobile devices M1, M2 cannot belong to users U2, U3, U4, U5. As a result, the two devices M1 and M2 are paired with single user U1. In some embodiments, in order to further increase reliability and robustness, the above elimination step is established only after multiple measurement instances consistently indicate elimination of a user (as opposed to single measurements only).

A. Providing the Position Information to the Person

In some embodiments, a person gets associated with one or a set of mobile devices. The mobile device may be an electronic item such as a smartphone/laptop/wearable smartglass that is being carried by the person, e.g., in his/her pocket/bag. Once the person is associated/tagged/paired with the mobile device (or a set of devices), the location information for the person (estimated through multi-camera image feeds) is fed back to one or all associated mobile devices by the positioning server. The person can then view his/her location on the associated device's screen or location is utilized by different applications running on the devices.

In some embodiments, the association between a device and a person is recorded and established through identifying an electronic identification (ID) associated with the device. That electronic ID is then linked/mapped with the person's image features. For instance, when Wi-Fi based positioning is used to locate a device, the Wi-Fi MAC address serial number can be used as the electronic ID to uniquely identify the device (similarly for Bluetooth®/NFC/RFID based positioning). When cellular waveforms are used for positioning a device, cellular International Mobile Station Equipment Identity (IMEI) serial number of the device can be used as the electronic ID. In some embodiments, other unique electronic IDs (such as the IP address for a cellular connection, or other serial numbers) are used to uniquely identify a device.

In some embodiments, the electronic ID associated with a device is used to communicate the location of the person (estimated through image processing) back to the device (e.g., as described by reference to FIG. 3) using the unique electronic ID. For instance, when a person opens a mapping application on a device, through this electronic ID (e.g., IP or MAC address) the positioning server pushes the location of the person to the display of the device for the person to see.

In some embodiments, once a device is associated with a particular person and the location of the person is estimated through image/video processing methods, location-based advertisement, coupons, notifications, and alerts are pushed to the device for viewing and consumption by the particular person.

B. Associating a Person's Image with a Mobile Device

In some embodiments, a camera on a device is used to associate a person with the device, where the positioning server identifies/positions/tracks the person through image feature recognition. In order to associate a person with his/her electronic device, the camera on the device is used to take snapshots of the person's image/features (e.g., the person's face, when face recognition is used for identifying and tracking). The captured image is then sent to the positioning server along with the device's unique identifications (IP address, MAC address, IMEI, etc.). The positioning server then matches the image from the device's camera against all the objects that are identified and tracked (through the snapshot feeds from multiple cameras in the environment). Once the image features received through the device's camera are matched with the person's image features, then the device gets associated with the person and location-based data for the person is pushed directly to the device for display to the person.

In some embodiments, the capture by a device's camera is implemented as follows. A person accesses/launches a map application on device 1 (e.g., a global map or a custom map application offered by a mall/campus/building/museum operator). At the launch of the map application the person is prompted to agree to a snapshot image to be taken (e.g., by a smartphone frontal camera) and send to a positioning server in exchange for accurate positioning services. Once the person accepts, the image is taken and sent to the positioning server by the map application on device 1, along with device 1's unique electronic IDs (MAC, IMEI, etc.).

II. Examples of Data Structures Used

FIG. 5 illustrates various database tables, information elements, and data structures that are maintained and managed by the positioning server in some embodiments of the invention. The figure shows examples of four sub-structures (or tables) 501-504 that are maintained and updated by the positioning server.

Once pairing between objects and electronics devices are established, the RF-based measurements (through associated electronic devices with Wi-Fi/cellular/GPS capabilities) are assigned to locations identified/estimated through image-based methods. The purpose of sub-database 501 is to store and map the RF characteristics 510 (e.g., Received Signal Strength Indicator (RSSI) or wideband RSSI (WRSSI) 515, AoA/ToA 520, propagation channel response 525) to positions (x, y, z) 530, and continuously update these data elements as more measurements and objects become available.

Some embodiments develop and fine-tune a database to enable propagation signature matching methods in some embodiments of the invention. Positioning methods based on propagation signature matching rely on matching a set of measured channel propagation profiles (or measured channel characteristics) against a pre-existing database (e.g., sub-database 501) of channel propagation measurements at known locations. The channel propagation profile is measured, for instance, by an electronic device located with respect to a set of access points or base stations. Channel measurement profiles may include RSSI or WRSSI, AOA/TOA, channel impulse response or combinations of them.

Signature-matching methods in the past require a scanning phase where an electronic device (with known location at every point in the scanning process) is used to scan many locations in the environment and record all propagation characteristics per scanning point in the environment. This scanning phase may become impractical (or resource extensive) for many environments and will require updating as the environment changes.

Figure 6:
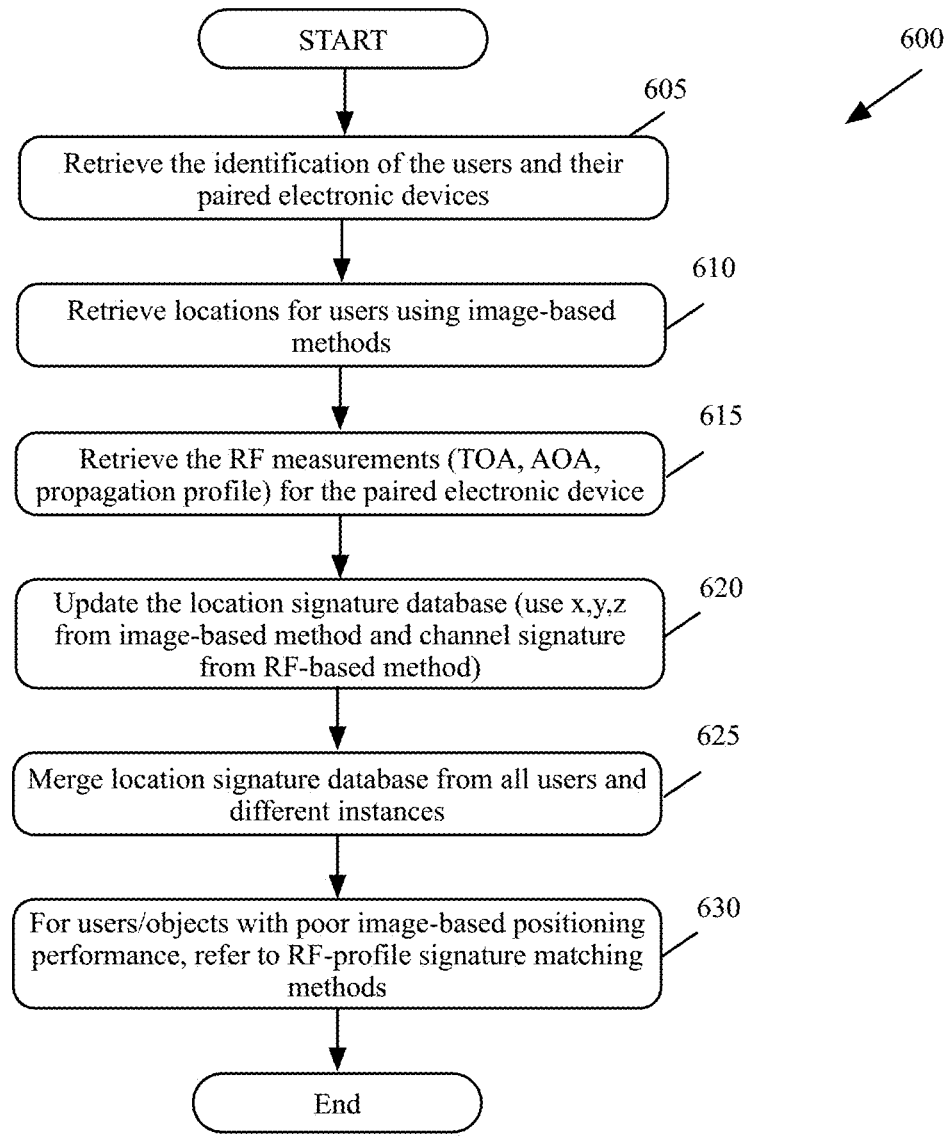
FIG. 6 conceptually illustrates a process for using image-based positioning for developing and improving RF-based signature matching positioning in some embodiments of the invention.

FIG. 6 conceptually illustrates a signature development process 600 that utilizes the combination of image-based and RF-based positioning methods and databases to dynamically develop an accurate "channel propagation measurements versus locations" database in some embodiments of the invention. Process 600 in some embodiments is performed by a positioning server. As shown, the process retrieves (at 605) identification of the objects/persons and their paired electronic devices from the database. The process then retrieves (at 610) the locations for objects/persons using image-based methods. The process then retrieves (at 615) the RF measurements (TOA, AOA, or other propagation profile parameters) for the paired electronic device.

The process then updates (at 620) the location signature database (using the coordinates x, y, z from image-based methods and channel signature from RF-based methods). The process then merges (at 625) data into the location signature database from all objects/persons and different instances. The process uses (at 630) RF-profile signature matching methods for persons or objects with poor image-based positioning performance. The process then ends.

By the signature matching method, the propagation profile of the device with respect to a set of access points is measured. These propagation profiles are then compared to the database of propagation profiles as a function of X, Y, Z. The closet propagation profile (or characteristics) in the database to that of measured profile is used to declare the corresponding X, Y, Z of that database element as the likeliest location for the device. Different method of signature-based positioning are described in U.S. Pat. No. 8,314, 736, entitled, "Determining the Position of a Mobile Device Using the Characteristics of Received Signals and a Reference Database," issued on Nov. 20, 2012. Contents of U.S. Pat. No. 8,314,736 are incorporated by reference.

A novel signature matching method is used in some embodiments of the invention. Existing signature matching methods rely on matching the channel characteristic at one instance against a pre-populated (or pre-scanned) database. One limitation with such methods occurs when the matching methods identify more than one location in the environment that correlate well (e.g., within a predetermined threshold) with the measured channel profile. In other words, there exists more than one location in the database (sub-database 501) with channel responses that pass the correlation criterion against a measured channel response. In such cases (that can happen often in an indoor environment), the signature matching methods cannot uniquely conclude a reliable position for an electronic device.

Some embodiments deploy an additional dimension into signature matching process to address the above possible ambiguity. The modified signature matching algorithm in these embodiments utilizes multiple instances of measurements to determine and/or finalize a positioning estimate. In these embodiments, the positioning server utilizes the past estimated positions (or trajectory of the mobile device or person) to narrow down the possible matches (from the database) for a measured channel profile. For example, assume for a channel profile measurement of CH1 at time T1 for mobile device M1, there are two locations in the sub-database 501, namely (X, Y, Z) and (X', Y', Z'), that have corresponding channel profiles that correlates well with measured CH1 profile. To address this ambiguity, the positioning method retrieves the previous location of mobile M1 at some time instance T1-Δ (where Δ is some programmable time gap). Now assume the retrieved data shows that mobile device M1 was at location (X0, Y0, Z0) at time instance T1-Δ. Then, from possible two matching candidates (X, Y, Z) and (X', Y', Z'), one matching candidate is ruled out. The ruled out position candidate is the position candidate that is at a distance from (X0, Y0, Z0) not feasible to be advanced/moved in time of Δ (depending on maximum speed of mobile device). One or ordinary skill in the art will realize that the same approach can be used to rule out multiple candidates when there are more that two position candidates with channel profiles that correlate well with measured CH1 profile.

The above embodiment is extended as follows. Speed limits based on the environment conditions and/or device types are used to define a possible region for a device at time T1 based on device's previous location at time T0. For example if device's location is estimated to be at (X0, Y0, Z0) at time T0, then it's location at time T1 may be constrained to a circle around (X0, Y0, Z0) with a radius of E+V*(T1−T0), where V is the max speed of device, and E is the estimation error for the location estimate at time T0. Using this method, the signature matching search region is constrained to the circle around (X0, Y0, Z0) with a radius of E+V*(T1−T0) and any matching point outside this region is ruled out (as impractical candidates).

The above constraining of region of search in some embodiments is extended to use multiple past locations of the device to more confidently determine a region for possible position of the device at current time. This constrained region is then used as signature matching search domain.

The constraining of region for signature searching/matching may rely on readings of some available mobile device sensors such as accelerometer, gyroscope, or velocity sensor (to provide parameters such as acceleration, direction, or speed) to project and narrow down the possible region of presence for a mobile device at time T0 based on past established location estimates. The constrained region is then used to limit the signature matching search domain for better performance, accuracy and lower processing effort.

As shown in FIG. 6, the paired objects/devices are used to generate matching points (e.g., a row in sub-database 501) where the position is measured by the image-based algorithms (applied on the object) and the propagation profile is measured based on RF waveforms of the electronic device (associated/paired with the object). This database is continuously updated as more samples are collected over time (through paired objects/devices) and is used to locate devices that have no associated objects or no reliable image-based calculated position.

Referring back to FIG. 5, sub-database 502 is used to store the locations and the electronic ID of the electronic devices in some embodiments. As electronic devices (e.g., smartphones, laptops, and wearable devices) are detected and positioned using RF-based methods, the list of devices 535 and their estimated positions 545 are stored under sub-database 502. In addition to RF-based positioning, unique electronic IDs 540 that are available are stored and mapped to the device (e.g., MAC IDs, IP addresses, etc.). The RF-based positions 545 are stored over time along with time stamps.

Once an objects or a person is associated with an electronic device (or multiple devices in some embodiments), the pair is stored under sub-database 503. As shown, sub-database 503 stores object's identifications 550, object image profile, 552, and the associated electronic devices 555.

As objects (e.g., visitors in a mall) are identified and located using image-based methods (multi-camera snapshots), the user IDs 560, the corresponding image features/profiles 565 (e.g., face snapshot, clothing features, color features) are stored in sub-database 504 and mapped to the corresponding image-based identified positions 570. These estimated positions are stored over time along with time stamps.

In some embodiments, the propagation profiles based on RF waveforms are measured and stored even for electronic devices that are not paired with any electronic devices. These propagation measurements are stored as a function of time as shown in sub-database 502 for all detected electronic devices. When device K is successfully associated with user K some time instance, the positioning server retrieves all previously stored data for device K and user K (e.g., over the past hour) and uses them to update and expand the elements of sub-database 501 with more entries. For instance, assume a person has been in a mall for duration of one hour. Over that hour, his/her smartphone's Wi-Fi connection has been used by the access points to measure and record channel propagation profiles every 10 seconds as he/she walks through the mall. Similarly, assume his/her image was detected at the point of entry and his/her image based positioning data has been stored every 10 seconds as he/she walks through the mall. Due to some limitations (crowded area, regions of accuracy not overlapping, etc.), the positioning server is only able to successfully associate him/her with his/her device at the end of mall tour. Once the pairing is established at the end of mall tour, all the collected and recorded data over the full hour of mall tour is retrieved by the positioning server and the sub-database 501 is updated accordingly.

Another application of some embodiments of the invention is detection of theft or loss of associated mobile devices. The disclosed method has the step of pairing a person with an electric device, as shown in FIGS. 3 and 4. There are several ways in which theft or loss of an electric device can be detected with the disclosed method. For example, a lost device that is stationary would not be able to be paired for a long duration with any person because the location of person changes with time but the lost device is stationary.

Another mechanism is the opposite of pairing, where a person that was previously paired with an electronic device gets dis-associated with that device because the person unintentionally leaves the device behind, or someone steals the device from the person and the device gets paired with that new someone instead. Thus, changes in sub-database 503 of FIG. 5 can be checked for loss or theft activity. For example, the server in some embodiments monitors each new pairing entry in sub-database 503 and checks to determine whether there was a prior pairing for that device with another person, and if so the server generates an alert for a suspicious event. If the person who has lost the device has multiple devices the alert can be sent to those other devices, or the alert could be sent to the appropriate police/security personnel. The video/images of suspicious event are also flagged and not erased for review by appropriate personnel.

Once a device is paired/associated with a person or an object, the positioning server uses the combination of location estimates through multi-camera snapshots and RF propagation measurements through the device to update its database on "location vs. RF propagation characteristics," as shown in FIG. 6. This continuously updated database is then used in some embodiments to locate electronic devices more accurately even if the multi-camera based positioning is not available/viable at certain instances and/or for certain objects. Under these embodiments suppose device 1 is already associated with object 1, and the positioning server uses multi-camera snapshot processing and locates object 1 at position (x, y, z). Then all RF characteristics measurements that are based on device 1's Wi-Fi/BT/NFC/cellular waveforms are captured, recorded, and assigned to position (x, y, z). Such RF characteristics may include RSSI/AoA/ToA measurements by any of the access points/base stations. Furthermore, the full propagation channel response from device 1 to any of the access points/base stations may be measured and recorded. This method creates and continuously updates a database of environment propagation fingerprint/signature as a function of location (x, y, z). The positioning server then uses this database for matching a measured RF propagation profile (RSSI, AoA, ToA, channel response) from a new electronic device in the environment to a position (x, y, z). Over time, the accuracy and resolution of this dynamic database improves significantly as more users with associated electronic devices are identified and tracked in the environment through both multi-camera and RF based positioning methods.

In some embodiments, the identified and tracked objects (and their image features) are stored by the positioning server for a long period of time for possible future tracking in order to speed up the initialization of the process. In other instances, the positioning server erases all identified objects and associated image features (and IDs) after a period of time (e.g., after one hour, one day) when higher privacy levels are desired.

III. Alternative Embodiments

A. Use of Infra-Red Images to Position an Object

In some embodiments, the cameras in FIG. 1 are equipped with a source of light that is used to emit light before the cameras capture images. In such cases, the light sources are synchronized with the cameras. In some embodiments, the light source emits infra-red (IR) light. In such cases, the persons would not notice the IR source (used for imaging and positioning) and the light source wouldn't alter or interfere with the natural lighting of the environment. The same camera sensor may be used for capturing images with natural light and/or IR light. This feature is particularly useful, and in some embodiments is enabled dynamically, when the natural or existing lighting of the environment is not sufficient for high quality image based positioning (e.g., at night or at low light conditions where the light intensity and/or the luminous flux/luminous power is below a threshold). The images captured based on reflected IR light are used for image-based positioning under some or all embodiments of this disclosure.

In some embodiments, the same camera in FIG. 1 is capable of detecting both natural light based images and IR based images. In these embodiments, these two image captures at any time instance may be used to identify the same person (for better accuracy or reliability). Image feature detection algorithms (e.g., face recognition) are applied to one or both image captures. Color-based feature detection algorithms are applicable to natural light based image capture.

In some embodiments, some of the cameras are special devices to detect the IR emissions due to natural heat of human body. In these embodiments, no IR light source is deployed. The IR emission due to natural heat of body is captured by the cameras.

Figure 7:
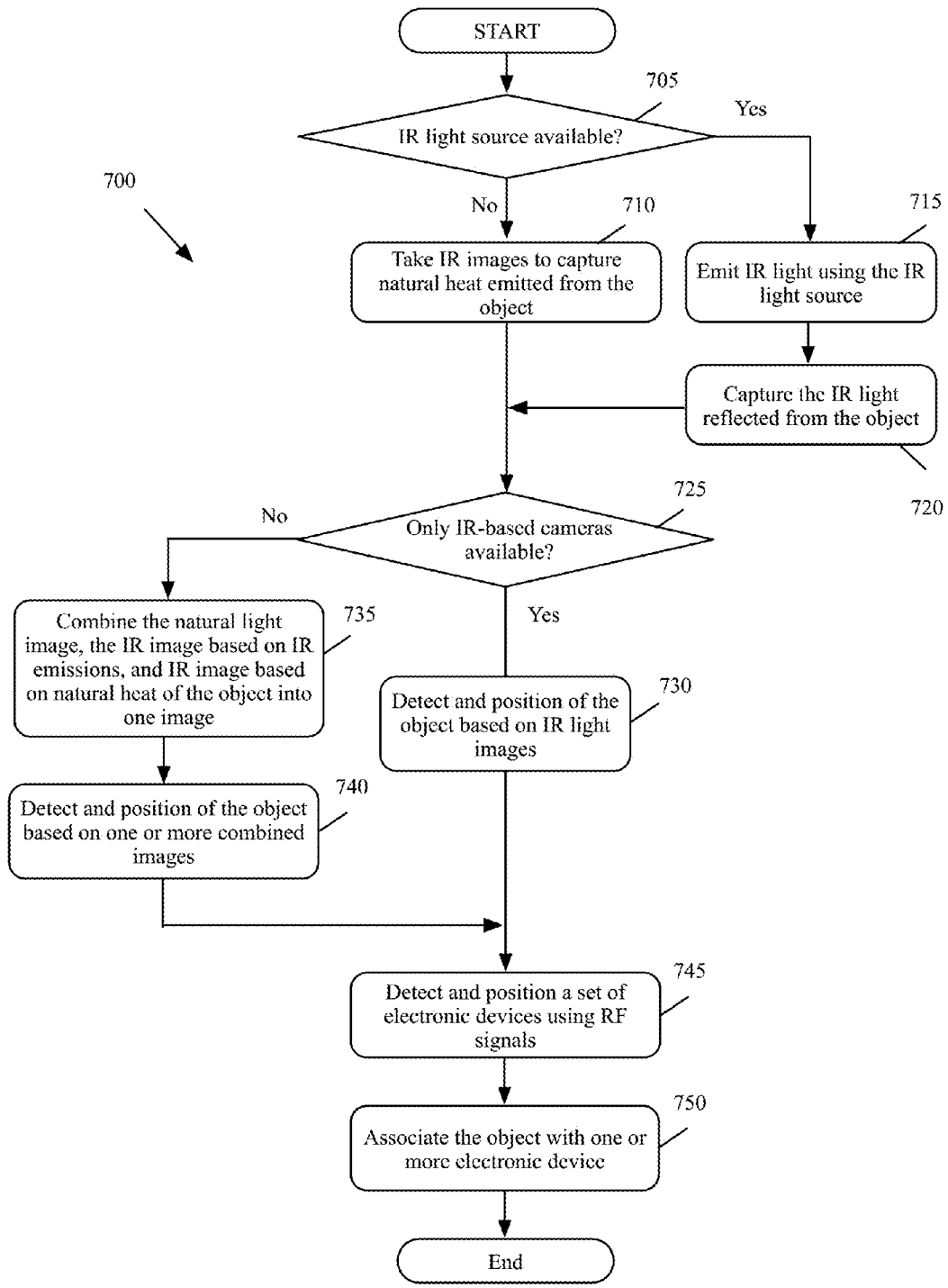
FIG. 7 conceptually illustrates a process for performing hybrid positioning using infra-red images in some embodiments of the invention.

FIG. 7 conceptually illustrates a process 700 for performing hybrid positioning using infra-red images in some embodiments of the invention. As shown, the process determines (at 705) whether an IR light source is available for a camera. If not, the process takes IR images (at 710) to capture the natural heat emitted from an object. The process then proceeds to 725, which is described below.

Otherwise, when an IR light source is available, the process emits (at 715) IR light using the IR light source. The process then captures (at 720) the reflected IR light. In some embodiments, the IR-based light source (and the camera capable of detecting IR light) is used to measure the TOA (time of arrival) between the cameras and other objects/persons in the environment. In this case, the IR light source is synchronized with the camera circuitry (some calibration processes may be taken to calibrate out any time delay between the two). The IR source then emits IR light at a known time stamp and the reflected IR light is captured by the corresponding camera and the time of capture is recorded. The difference between time of IR light transmission and reception is calculated and corresponding time-of-arrival (TOA) is measured using IR propagation. This TOA may be measured as a function of angle of departure of the IR light source. The process repeats operations 705-720 for all IR cameras in the environment to take IR images of an object.

In some embodiments, all three of image capture types are used for image-based detection and positioning: natural-light based image captures, IR-based captures based on emitting IR by some IR light sources, IR-based captures based on IR emissions due to natural heat of an object such as the human body. The process determines (at 725) whether only IR-based cameras are available. If not, the process proceeds to 735, which is described below. Otherwise, the process uses (at 730) the IR images to detect the presence and the features of persons or objects in the environment. The heat-based IR reflections are captured by the cameras for two possible uses: (i) to detect presence of persons or objects in the environment, (ii) to identify and track persons or objects based on feature detection based on these IR-based captures. The process then proceeds to 745, which is described below.

In some embodiments two of the three image capture types, or all three image capture types, are combined (at 735) into a hybrid combined image. For example, a natural-light image is represented as a combination of red, green and blue color channels (RGB), while an IR-based image is represented as grey-scale intensity image. The natural-light image is then used to add chrominance information to the IR-based image. One such method is to transform the natural-light RGB image into a chrominance-luminance representation, and then replace the luminance with the IR-based intensity image. The resulting combined image can then show complementary information that is not present in either of the original images, with the potential of providing improved contrast and sharpness. The process then uses (at 740) the combined image to detect and position the object. The process then detects and positions (at 745) a set of electronic devices using RF signals. The process then associates (at 750) the object with one or more electronic devices. The process then ends. Operations 745 and 750 are described in detail in the previous sections and are not repeated here for brevity.

Some embodiments utilize the IR-image based positioning for populating the signature database. Once a device is paired/associated with a person or an object, the positioning server uses the combination of location estimates through IR-images and combined images as well as the RF propagation measurements through the paired device to update the database on "location vs. RF propagation characteristics," as described by reference to FIG. 6, above. This continuously updated database is then used in some embodiments to locate electronic devices more accurately even if the multi-camera based positioning is not available/viable at certain instances and/or for certain objects.

B. Use of Different Characteristics of a Device to Pair the Device with an Object In the above-described embodiments, the estimated position of a device (by RF methods) and its vicinity to an object's or a person's location (by image methods) is used to pair the object or person with the device. The same methods and procedures may be applied to other characteristics of a device to uniquely pair it with a person. For instance, assume the access points identify the WLAN standard generation/version (e.g., 802.11b vs. 802.11a vs. 802.11ac) of the electronic devices. Then the positioning server may monitor the WLAN version of devices in the vicinity of object 1 at multiple instances. If only a single device with 801.11ac version is identified to be at the vicinity of object 1 in all instances, then that device with 802.11ac connectivity is paired (e.g., by the operation 215 of FIG. 2) with object 1. The above procedure is extended in some embodiments to device's long-term evolution (LTE) version, Bluetooth® version, multiple-input multiple-output (MIMO) capability where the device has multiple antennas for receiver and/or transmitter, etc.

C. Use of Sound Waves to Position an Object

In some embodiments, the still image/video cameras are complemented/substituted with sound-based sensors (e.g., ultrasound sensors). The same procedures described above are then reused for sound-based sensors. In such cases, the sound sensors have sound transmitters and receivers. Sound transmitters emit sound pulses (e.g., ultrasound pulses) and their reflections are captured by multiple sound receivers and used to create images. These images are then used to identify and locate an object/person in the environment. Similar procedures are then used for pairing and tracking.

Figure 8:
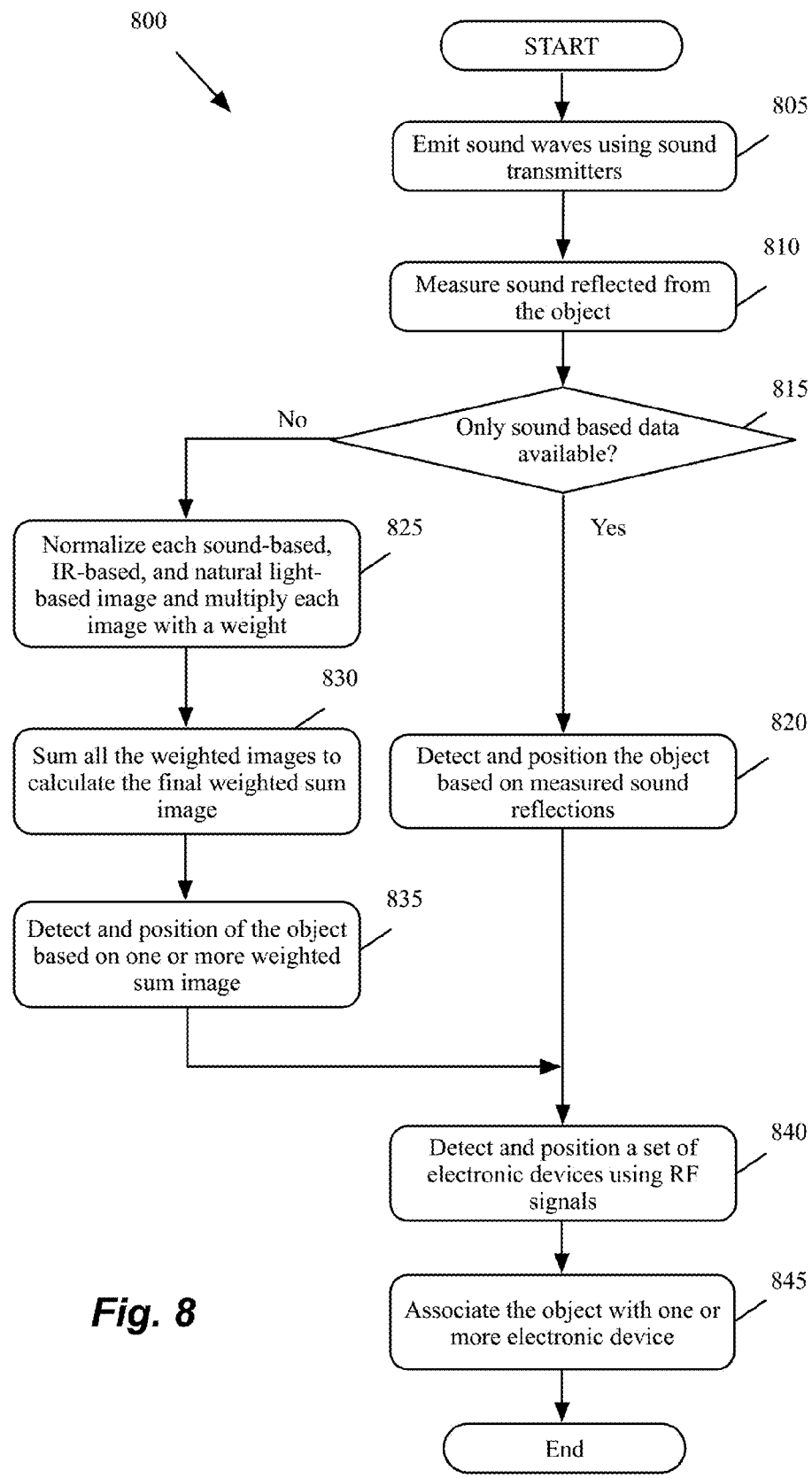
FIG. 8 conceptually illustrates a process for performing hybrid positioning using sound waves in some embodiments of the invention.

FIG. 8 conceptually illustrates a process 800 for performing hybrid positioning using sound waves in some embodiments of the invention. As shown, the process emits (at 805) sound waves using sound transmitters. The process then measures (at 810) the sounds reflected from the object. Some embodiments utilize sound transmitters to emit sound waves and then use the sound sensors/receivers to measure the reflections.

The process then determines (at 815) whether only sound based data is available for an object. If not, the process proceeds to 825, which is described below. Otherwise, the process detects and positions (at 820) the object using the sound waves reflected from the object. The round-trip time (from launch of sound waveform to receiving the reflection) is used to identify the location of objects in the environment, similar to RF time-of-arrival based methods. The process then proceeds to 840, which is described below.

The sound reflections in some embodiments are used to develop a 3D image of the environment. This sound-based image is then used in addition to other time of arrival (TOA) image methods (IR, RF), as well as natural light images and RF-based location data through a fusion method.

In some embodiments process 800 performs the fusion method and normalizes (at 825) each image and multiplies each image with a weight. The process then sums (at 830) all the weighted images to calculate the final weighted sum image. The weighting coefficients that are used for each image are proportional to the accuracy and reliability of each method (sound, IR, RF) in some embodiments. For example, sound imaging may provide better images in low light environments, and/or environments that have good reflectors for sound.

The process then uses one or more of the weighted sum images to detect and position (at 835) the object. The process then detects and positions (at 840) a set of electronic devices using RF signals. The process then associates (at 845) the object with one or more electronic devices. The process then ends. Operations 840 and 845 are described in detail in the previous sections and are not repeated here for brevity.

Some embodiments utilize the sound based positioning for populating the signature database. Once a device is paired/associated with a person or an object, the positioning server uses the combination of location estimates through sound created images and combined/fusioned images as well as the RF propagation measurements through the paired device to update the database on "location vs. RF propagation characteristics," as described by reference to FIG. 6, above. This continuously updated database is then used in some embodiments to locate electronic devices more accurately even if the multi-camera based positioning is not available/viable at certain instances and/or for certain objects.

IV. Electronic System

Many of the above-described features and applications are implemented as software processes that are specified as a set of instructions recorded on a computer readable storage medium (also referred to as computer readable medium, machine readable medium, machine readable storage). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

A. Mobile Devices

Figure 9:
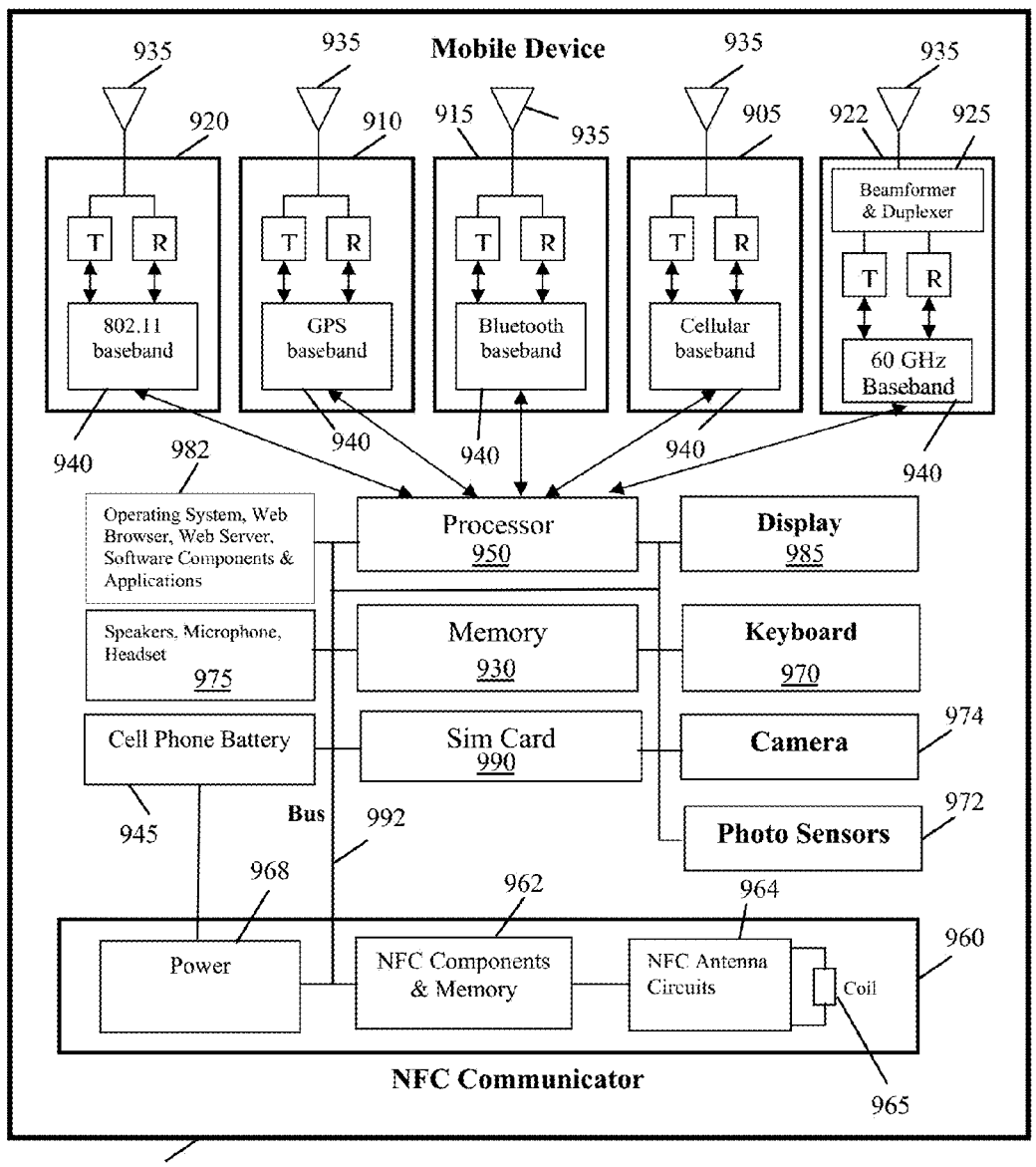
FIG. 9 conceptually illustrates a block diagram of a mobile device in some embodiments of the invention.

The positioning methods of some embodiments are used to determine the position of a person or object and pair it to mobile devices such as smart phones, tablets, personal data assistance (PDA) devices, etc. FIG. 9 conceptually illustrates a block diagram of a mobile device 900 with short-range and long-range communication radios in some embodiments of the invention. Although some of the examples and illustrations describe a mobile phone the invention is applicable to a variety of consumer electronics devices, some of which were listed above. In FIG. 9 some of the blocks and radios are optional and are found in more advanced smart phones. The figure shows several wireless radio modules with antennas 935 that transmit and receive electromagnetic waves, and baseband transceivers 940 that process the information. Thus, in addition to the cellular radio 905, the mobile device has different range radios such as GPS 910, Bluetooth® 915, 802.11 (Wi-Fi) 920, 60 GHz 922 with beam-forming 925, RFID (not shown in the figure), etc. These radios share the same antenna or use separate antennas in different embodiments. Mobile devices that are cellular phones include the cellular radio 905, while other mobile devices may not include cellular radio but include one or more short-range radios and/or NFC.

As shown, the mobile device includes a processor 950. The mobile phone also has an NFC communicator 960 that obtains its power 968 from the mobile device battery 945 and includes NFC components 962 and memory 962, NFC antenna circuits 964 and one or more coils 965. The NFC communicator 960 is used to read NFC tags, barcodes, smart cards, and interface with electronic payment systems in some embodiments.

The memory 930 has read-only-memory (ROM) for program storage and random access memory (RAM) for running programs. The operating system 982 (shown with several other software components and applications) interfaces the hardware with the person and manages resources.

The mobile device includes keyboard and/or touch screen 970, display 985, and audio components 975 (microphone, speakers, wired or wireless headset, etc.). The mobile device also includes a camera 974 and photo-sensors 972 for still pictures and video. The mobile phone has a subscriber identity (or identification) module (SIM) card 990 and a number of dedicated software components and applications such as email, instant messenger, chat, SMS, social networking, and camera. The mobile phone also has a web server 982 and browser 982 that can browse information on the intranet/Internet and download other applications and data from the network. There is a bus 992 that links all these components with the processor 950 and 930 memory.

B. Computer System

FIG. 10 conceptually illustrates an electronic system 1000 with which some embodiments of the invention (e.g., the positioning servers) are implemented. The electronic system 1000 may be a computer (e.g., a desktop computer, personal computer, tablet computer, server, etc.) or any other sort of electronic or computing device. Such an electronic system includes various types of computer readable media and interfaces for various other types of computer readable media. Electronic system 1000 in some embodiments includes a bus 1005, processing unit(s) 1010, a system memory 1020, a network 1025, a read-only memory 1030, a permanent storage device 1035, input devices 1040, and output devices 1045.

The bus 1005 collectively represents all system, peripheral, and chipset buses that communicatively connect the numerous internal devices of the electronic system 1000. For instance, the bus 1005 communicatively connects the processing unit(s) 1010 with the read-only memory 1030, the system memory 1020, and the permanent storage device 1035.

From these various memory units, the processing unit(s) 1010 retrieves instructions to execute and data to process in order to execute the processes of the invention. The processing unit(s) may be a single processor or a multi-core processor in different embodiments.

The read-only-memory (ROM) 1030 stores static data and instructions that are needed by the processing unit(s) 1010 and other modules of the electronic system. The permanent storage device 1035, on the other hand, is a read-and-write memory device. This device is a non-volatile memory unit that stores instructions and data even when the electronic system 1000 is off. Some embodiments of the invention use a mass-storage device (such as a magnetic or optical disk and its corresponding disk drive) as the permanent storage device 1035.

Other embodiments use a removable storage device (such as a floppy disk, flash memory device, etc., and its corresponding disk drive) as the permanent storage device. Like the permanent storage device 1035, the system memory 1020 is a read-and-write memory device. However, unlike storage device 1035, the system memory 1020 is a volatile read-and-write memory, such a random access memory. The system memory 1020 stores some of the instructions and data that the processor needs at runtime. In some embodiments, the invention's processes are stored in the system memory 1020, the permanent storage device 1035, and/or the read-only memory 1030. For example, the various memory units include instructions for processing multimedia clips in accordance with some embodiments. From these various memory units, the processing unit(s) 1010 retrieves instructions to execute and data to process in order to execute the processes of some embodiments.

The bus 1005 also connects to the input and output devices 1040 and 1045. The input devices 1040 enable the user to communicate information and select commands to the electronic system. The input devices 1040 include alphanumeric keyboards and pointing devices (also called "cursor control devices"), cameras (e.g., webcams), microphones or similar devices for receiving voice commands, etc. The output devices 1045 display images generated by the electronic system or otherwise output data. The output devices 1045 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 10, bus 1005 also couples electronic system 1000 to a network 1025 through a network adapter (not shown). In this manner, the computer can be a part of a network of computers (such as a local area network ("LAN"), a wide area network ("WAN"), or an Intranet, or a network of networks, such as the Internet. Any or all components of electronic system 1000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of this specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (e.g., FIGS. 2-4 and 6-8) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method of providing a position of an object, the method comprising:
   determining the position of the object using a plurality of images taken by a set of cameras;
   identifying a set of electronic devices within a predetermined distance of the object based on a set of radio frequency (RF) signals received from each electronic device in the set of electronic devices;
   associating one or more electronic devices in the set of electronic devices with the object based on a distance between the object and each of said one or more electronic devices at one or more instances of time; and
   sending the position of the object determined by using the plurality of images to each of said one or more associated electronic devices.

2. The method of claim 1 further comprising:
   receiving RF measurements corresponding to the determined position of the object from each associated electronic device; and
   storing the RF measurements received from each associated electronic device in a database as an RF-profile signature for the determined position.

3. The method of claim 1, wherein the determined position of the object is a first position, the method further comprising:

determining that the object has moved from the first position;
determining a second position of the object using a plurality of images taken by the set of cameras;
determining that an accuracy of the second position of the object is below a threshold;
determining a channel propagation profile from the RF signals received from each electronic device associated with the object;
comparing the channel propagation profile determined for each electronic device associated with the object with a set of RF-profile signature retrieved from a database;
determining a position of each electronic device associated with the object based on the comparison; and
revising the second position of the object based on the determined positions of each electronic device associated with the object.

4. The method of claim 1, wherein identifying a set of electronic devices within a predetermined distance of the object based on a set of radio frequency (RF) signals received from each electronic device comprises:
determining a channel propagation profile from the set of RF signals received from each electronic device;
comparing the channel propagation profile determined for each electronic device with a set of channel propagation profiles retrieved from a database;
determining a position of each electronic device based on the comparison; and
determining that a distance between the determined position of each electronic device and the position of the object is within the predetermined distance.

5. The method of claim 4 further comprising:
determining that a plurality of channel propagation profiles from the set of channel propagation profiles retrieved from a database matches the measured propagation profile received from a particular electronic device, the plurality of channel propagation profiles corresponding to a plurality of positions retrieved from the database;
determining a search region for the particular electronic device centered around a previous position of the particular electronic device, the search region radius determined based on (i) a maximum speed of the particular electronic device and (ii) an elapsed time since the previous position was determined; and
determining a position of the particular electronic device from one or more of the positions retrieved from the database that are within the search region.

6. The method of claim 5, wherein determining a position of the particular electronic device from one or more of the positions retrieved from the database that are within the search region comprises:
determining that only one position from the positions retrieved from the database is within the search region; and
setting the position of the particular electronic device to the only position from the positions retrieved from the database that is within the search region.

7. The method of claim 6, wherein the search region is a first search region, wherein the previous position of the particular electronic device is a first previous position, wherein determining a position of the particular electronic device from one or more of the positions retrieved from the database that are within the search region comprises:
determining that more than one positions from the positions retrieved from the database are within the search region;
determining a second search region for the particular electronic device centered around a second previous position of the particular electronic device, the search region radius determined based on (i) a maximum speed of the particular electronic device and (ii) an elapsed time since the second previous position was determined; and
determining the position of the particular electronic device from one or more of the positions retrieved from the database that are within the second search region.

8. The method of claim 1 further comprising:
identifying the object in a plurality of camera feeds using one of image processing, pattern recognition, and feature detection on said plurality of images; and
extracting a two-dimensional position of the object from the plurality of the images,
wherein determining the position of the object using a plurality of images comprises determining the position of the object based on the extracted two-dimensional position of the object, a position of each camera in the set of cameras, and an orientation of each camera in the set of cameras.

9. The method of claim 1, wherein associating one or more electronic devices in the set of electronic devices with the object based on the distance between each of said one or more electronic devices and the object at one or more instances of time comprises:
determining the position of the object at said one or more instances of time;
determining the position of each associated electronic device at said one or more instances of time; and
determining that each associated electronic device is within a predetermined distance of the object at said one or more instances of time.

10. The method of claim 1, wherein associating each electronic device in the set of electronic devices with the object further comprises:
determining a communication standard used by the associated electronic device; and
determining that the associated electronic device is the only electronic device using said standard within said predetermined distance of the object in all said one or more instances of time.

11. The method of claim 10, wherein the communication standard is one of an 802.11 communication protocol version, a Bluetooth version, a long-term evolution (LTE) version, and a multiple-input multiple-output (MIMO) capability of the associated electronic device.

12. The method of claim 1, wherein the cameras are infrared cameras.

13. The method of claim 1, wherein each associated device comprises a display, wherein the position of object is for each associated device to display on the display of associated device.

14. A non-transitory machine readable medium storing a program for providing a position of an object, the program executable by at least one processing unit, the program comprising sets of instructions for:
determining the position of the object using a plurality of images taken by a set of cameras;
identifying a set of electronic devices within a predetermined distance of the object based on a set of radio frequency (RF) signals received from each electronic device in the set of electronic devices;
associating one or more electronic devices in the set of electronic devices with the object based on a distance between the object and each of said one or more electronic devices at one or more instances of time; and sending the position of the object determined by using the plurality of images to each of said one or more associated electronic devices.

15. The non-transitory machine readable medium of claim 14, wherein the set of instructions for identifying a set of electronic devices within a predetermined distance of the object based on a set of radio frequency (RF) signals received from each electronic device comprises sets of instructions for:

determining a channel propagation profile from the set of RF signals received from each electronic device;

comparing the channel propagation profile determined for each electronic device with a set of channel propagation profiles retrieved from a database;

determining a position of each electronic device based on the comparison; and determining that a distance between the determined position of each electronic device and the position of the object is within the predetermined distance.

16. The non-transitory machine readable medium of claim 15, the program further comprising sets of instructions for:

determining that a plurality of channel propagation profiles from the set of channel propagation profiles retrieved from a database matches the measured propagation profile received from a particular electronic device, the plurality of channel propagation profiles corresponding to a plurality of positions retrieved from the database;

determining a search region for the particular electronic device centered around a previous position of the particular electronic device, the search region radius determined based on (i) a maximum speed of the particular electronic device and (ii) an elapsed time since the previous position was determined; and determining a position of the particular electronic device from one or more of the positions retrieved from the database that are within the search region.

17. The non-transitory machine readable medium of claim 14, wherein the cameras are infrared cameras.

18. The non-transitory machine readable medium of claim 14, wherein each associated device comprises a display, wherein the position of object is for each associated device to display on the display of associated device.

19. An apparatus comprising:

a set of processing units for executing sets of instructions;

a non-transitory machine readable medium storing a program which when executed by one of the processing units provides a position of an object, the program comprising sets of instructions for:

determining the position of the object using a plurality of images taken by a set of cameras;

identifying a set of electronic devices within a predetermined distance of the object based on a set of radio frequency (RF) signals received from each electronic device in the set of electronic devices;

associating one or more electronic devices in the set of electronic devices with the object based on distances between the object and each of said one or more electronic devices at one or more instances of time; and sending the position of the object determined by using the plurality of images to each of said one or more associated electronic devices.

20. The apparatus of claim 19, wherein the set of instructions for identifying a set of electronic devices within a predetermined distance of the object based on a set of radio frequency (RF) signals received from each electronic device comprises sets of instructions for:

determining a channel propagation profile from the set of RF signals received from each electronic device;

comparing the channel propagation profile determined for each electronic device with a set of channel propagation profiles retrieved from a database;

determining a position of each electronic device based on the comparison; and determining that a distance between the determined position of each electronic device and the position of the object is within the predetermined distance.

21. The apparatus of claim 19, wherein the cameras are infrared cameras.

22. The apparatus of claim 19, wherein each associated device comprises a display, wherein the position of object is for each associated device to display on the display of associated device.

* * * * *